United States Patent
Hu et al.

(10) Patent No.: US 11,422,318 B2
(45) Date of Patent: Aug. 23, 2022

(54) PUSH PULL MECHANISM FOR AN OUTDOOR RATED CONNECTOR ASSEMBLY

(71) Applicant: Senko Advanced Components, Inc., Marlborough, MA (US)

(72) Inventors: Ming Zhen Hu, Shanghai (CN); Man Kit Wong, Kowloon (HK)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 16/988,256

(22) Filed: Aug. 7, 2020

(65) Prior Publication Data

US 2021/0041641 A1 Feb. 11, 2021

Related U.S. Application Data

(60) Provisional application No. 62/884,520, filed on Aug. 8, 2019.

(51) Int. Cl.
*G02B 6/38* (2006.01)

(52) U.S. Cl.
CPC ........ *G02B 6/3893* (2013.01); *G02B 6/3817* (2013.01); *G02B 6/3831* (2013.01); *G02B 6/3847* (2013.01)

(58) Field of Classification Search
None
See application file for complete search history.

(56) References Cited

U.S. PATENT DOCUMENTS

| | | | |
|---|---|---|---|
| 5,832,158 A * | 11/1998 | Chen | G02B 6/3825 385/87 |
| 5,920,669 A * | 7/1999 | Knecht | G02B 6/3879 385/76 |
| 6,116,790 A | 9/2000 | Vergeest | |
| 6,409,393 B1 | 6/2002 | Grois et al. | |
| 6,542,674 B1 | 4/2003 | Gimblet | |
| 6,546,175 B1 | 4/2003 | Wagman | |
| 6,585,423 B1 | 7/2003 | Vergeest | |
| 6,648,520 B2 | 11/2003 | McDonald | |
| 6,714,710 B2 | 3/2004 | Gimblet | |
| 6,785,450 B2 | 8/2004 | Wagman | |
| 6,899,467 B2 | 5/2005 | McDonald | |

(Continued)

FOREIGN PATENT DOCUMENTS

WO WO2010039830 A2 4/2010
WO WO2010039830 A3 6/2010

(Continued)

OTHER PUBLICATIONS

International Search Report and Written Opinion for PCT Application No. PCT/US2020/045468 dated Dec. 22, 2020.

(Continued)

*Primary Examiner* — Rhonda S Peace

(57) ABSTRACT

An outdoor rated ingress protected connector assembly is formed by a mating connector and a first connector. A lock ring secures the mating connector and first connector together. An outer collar nut is displaceable to unlock the connector assembly to gain access to the internal components. The mating connector and first connector have a fiber optic connector secured therein, which form a transmission pathway when the connector assembly is formed.

14 Claims, 13 Drawing Sheets

(56) References Cited

U.S. PATENT DOCUMENTS

| | | |
|---|---|---|
| 6,908,233 B2 | 6/2005 | Nakajima et al. |
| 7,001,079 B2 | 2/2006 | Vergeest |
| 7,090,406 B2 | 8/2006 | Melton |
| 7,090,407 B2 | 8/2006 | Melton |
| 7,111,990 B2 | 9/2006 | Melton |
| 7,113,679 B2 | 9/2006 | Melton |
| 7,118,283 B2 | 10/2006 | Nakajima et al. |
| 7,234,875 B2 | 6/2007 | Krowiak |
| 7,241,056 B1 | 7/2007 | Kuffel |
| 7,264,402 B2 | 9/2007 | Theuerkorn et al. |
| 7,281,856 B2 | 10/2007 | Grzegorzewska |
| 7,344,317 B2 | 3/2008 | Krowiak |
| 7,429,136 B2 | 9/2008 | Lewallen |
| 7,467,896 B2 | 12/2008 | Melton |
| 7,476,035 B2 | 1/2009 | Cull et al. |
| 7,539,380 B1 | 5/2009 | Abernathy et al. |
| 7,559,700 B2 | 7/2009 | Eguchi et al. |
| 7,567,741 B2 | 7/2009 | Abernathy et al. |
| 7,572,065 B2 | 8/2009 | Lu |
| 7,654,747 B2 | 2/2010 | Theuerkorn |
| 7,654,748 B2 | 2/2010 | Kuffel |
| 7,744,286 B2 | 6/2010 | Lu |
| 7,744,288 B2 | 6/2010 | Lu |
| 7,762,726 B2 | 7/2010 | Lu |
| 7,785,015 B2 | 8/2010 | Melton |
| 7,785,019 B2 | 8/2010 | Lewallen |
| 7,796,853 B2 | 9/2010 | Abernathy et al. |
| 7,881,576 B2 | 2/2011 | Melton |
| 7,891,882 B2 | 2/2011 | Kuffel |
| 7,918,609 B2 | 4/2011 | Melton |
| 7,942,590 B2 | 5/2011 | Lu |
| 7,959,361 B2 | 6/2011 | Lu |
| 8,052,333 B2 | 11/2011 | Kuffel |
| 8,202,008 B2 | 6/2012 | Lu |
| 8,202,009 B2 | 6/2012 | Lin et al. |
| 8,231,282 B2 | 7/2012 | Kuffel |
| 8,272,790 B2 | 9/2012 | Belsan et al. |
| 8,297,850 B2 | 10/2012 | Nishioka |
| 8,348,519 B2 | 1/2013 | Kuffel |
| 8,414,196 B2 | 4/2013 | Lu |
| 8,496,384 B2 | 7/2013 | Kuffel |
| 8,506,173 B2 | 8/2013 | Lewallen |
| 8,573,859 B2 | 11/2013 | Larson |
| 8,628,252 B2 * | 1/2014 | Matsumoto .......... G02B 6/3879 385/56 |
| 8,672,560 B2 | 3/2014 | Haley |
| 8,699,467 B2 | 4/2014 | Lindoff |
| 8,714,835 B2 | 5/2014 | Kuffel |
| 8,770,862 B2 | 7/2014 | Lu |
| 8,814,441 B2 | 8/2014 | Strasser et al. |
| 8,840,320 B2 | 9/2014 | Park |
| 8,939,654 B2 | 1/2015 | Lu |
| 9,103,995 B2 | 8/2015 | Park |
| 9,239,441 B2 | 1/2016 | Melton |
| 9,291,780 B2 | 3/2016 | Lu |
| 9,304,262 B2 | 4/2016 | Lu |
| 9,310,570 B2 | 4/2016 | Busse |
| 9,397,441 B2 | 7/2016 | Sun |
| 9,442,257 B2 | 9/2016 | Lu |
| 9,477,049 B2 * | 10/2016 | Gniadek ............... G02B 6/3894 |
| 9,482,829 B2 | 11/2016 | Lu |
| 9,519,114 B2 | 12/2016 | Zimmel |
| 9,535,230 B2 | 1/2017 | Newbury |
| 9,658,407 B2 * | 5/2017 | Völker ................. G02B 6/3869 |
| 9,664,862 B2 | 5/2017 | Lu |
| 9,684,138 B2 | 6/2017 | Lu |
| 9,733,436 B2 | 8/2017 | Van Baelen |
| 9,739,951 B2 | 8/2017 | Busse |
| 9,854,151 B2 | 12/2017 | Endo |
| 9,964,715 B2 | 5/2018 | Lu |
| 9,983,366 B2 | 5/2018 | Bund |
| 10,012,802 B2 | 7/2018 | Newbury |
| 10,101,538 B2 | 10/2018 | Lu |
| 10,114,176 B2 | 10/2018 | Gimblet |
| 10,146,015 B2 | 12/2018 | Zimmel |
| 10,162,126 B2 | 12/2018 | Elenbaas |
| 10,180,541 B2 | 1/2019 | Coenegracht |
| 10,197,739 B2 | 2/2019 | Ohtsuka |
| 10,234,641 B2 | 3/2019 | Hill |
| 10,317,628 B2 | 6/2019 | Van Baelen |
| 10,338,323 B2 | 7/2019 | Lu |
| 10,401,578 B2 | 9/2019 | Coenegracht |
| 10,451,811 B2 | 10/2019 | Coenegracht |
| 10,473,866 B2 | 11/2019 | Newbury |
| 10,502,907 B2 | 12/2019 | Wang |
| 10,613,278 B2 | 4/2020 | Kempeneers et al. |
| 2006/0045428 A1 | 3/2006 | Theuerkorn |
| 2007/0036487 A1 * | 2/2007 | Grzegorzewska ... G02B 6/3825 385/53 |
| 2008/0273855 A1 | 11/2008 | Bradley |
| 2009/0257717 A1 | 10/2009 | Liu |
| 2010/0111477 A1 * | 5/2010 | Strasser ............... G02B 6/3879 385/56 |
| 2010/0329267 A1 | 12/2010 | Sakamoto |
| 2011/0123157 A1 * | 5/2011 | Belsan ............... H01R 13/6315 385/75 |
| 2011/0222826 A1 | 9/2011 | Blackburn |
| 2013/0136398 A1 | 5/2013 | Isenhour |
| 2016/0178859 A1 | 6/2016 | Thompson et al. |
| 2016/0266326 A1 * | 9/2016 | Gniadek ................ H01R 24/66 |
| 2017/0227719 A1 | 8/2017 | Zimmel |
| 2018/0224610 A1 | 8/2018 | Pimentel |
| 2018/0231720 A1 | 8/2018 | Lu |
| 2019/0107667 A1 | 4/2019 | Huang |
| 2019/0107677 A1 | 4/2019 | Coenegracht |
| 2019/0146161 A1 | 5/2019 | Elenbaas |
| 2019/0179088 A1 | 6/2019 | Zimmel |
| 2019/0235177 A1 | 8/2019 | Lu |
| 2019/0302374 A1 * | 10/2019 | Lee ....................... H01R 27/00 |
| 2019/0302389 A1 | 10/2019 | Newbury |
| 2019/0324217 A1 | 10/2019 | Lu |
| 2019/0369336 A1 | 12/2019 | Van Baelen |
| 2020/0003965 A1 | 1/2020 | Coenegracht |
| 2020/0012051 A1 | 1/2020 | Coenegracht |
| 2020/0241218 A1 | 7/2020 | Kempeneers et al. |
| 2021/0041641 A1 * | 2/2021 | Hu ......................... G02B 6/389 |

FOREIGN PATENT DOCUMENTS

| | | |
|---|---|---|
| WO | WO2016073273 A2 | 5/2016 |
| WO | WO2016073273 A3 | 6/2016 |
| WO | WO2018157115 A1 | 8/2018 |
| WO | WO2019173350 A1 | 9/2019 |

OTHER PUBLICATIONS

International Search Report and Written Opinion for PCT Application No. PCT/US2020/0454668 dated Dec. 22, 2020.

* cited by examiner

PUSH PULL MECHANISM FOR AN OUTDOOR RATED CONNECTOR ASSEMBLY

CROSS REFERENCE TO RELATED APPLICATIONS

This is the non-provisional application of U.S. Application Ser. No. 62/884,520, filed Aug. 8, 2019, entitled PUSH PULL MECHANISM FOR OUTDOOR RATED HYBRID CONNECTOR, the entire contents of which is incorporated herein by reference.

FIELD OF THE INVENTION

The present disclosure relates generally to fiber optic connectors and connector assemblies, and specifically to an outdoor rated connector assembly ingress protected from moisture and debris.

BACKGROUND

The reliability of communication infrastructure depends on secure connections between components, such as cable segments, network equipment, and communication devices. Such connections are continually exposed to dust, dirt, moisture, and/or other contaminants that may infiltrate the connections and degrade performance or even sever the connection between components. Conventional connection assemblies, such as typical fiber optic connectors, are generally not capable of providing an adequate seal to fully prevent the ingress of unwanted fluids (for instance, water) or solid contaminants. Fiber optic network segments are particularly vulnerable because fiber optic connections require extremely precise termination and alignment between connected components and cable segments that maybe damaged by the presence of fluid or solid contaminants. As such, fiber optic network segments connected using conventional technology are very susceptible to performance and/or availability degradation over time. Accordingly, telecommunication network providers would benefit from a connection assembly capable of maintaining a sealable and secure connection configured to prevent the ingress of unwanted materials into a connector assembly with a reduced number of parts and ease of separating the connector assembly to access internal components.

BRIEF DESCRIPTION OF THE DRAWINGS

Corresponding reference numbers indicate corresponding parts throughout the figures.

SUMMARY OF THE INVENTION

Figure 1:
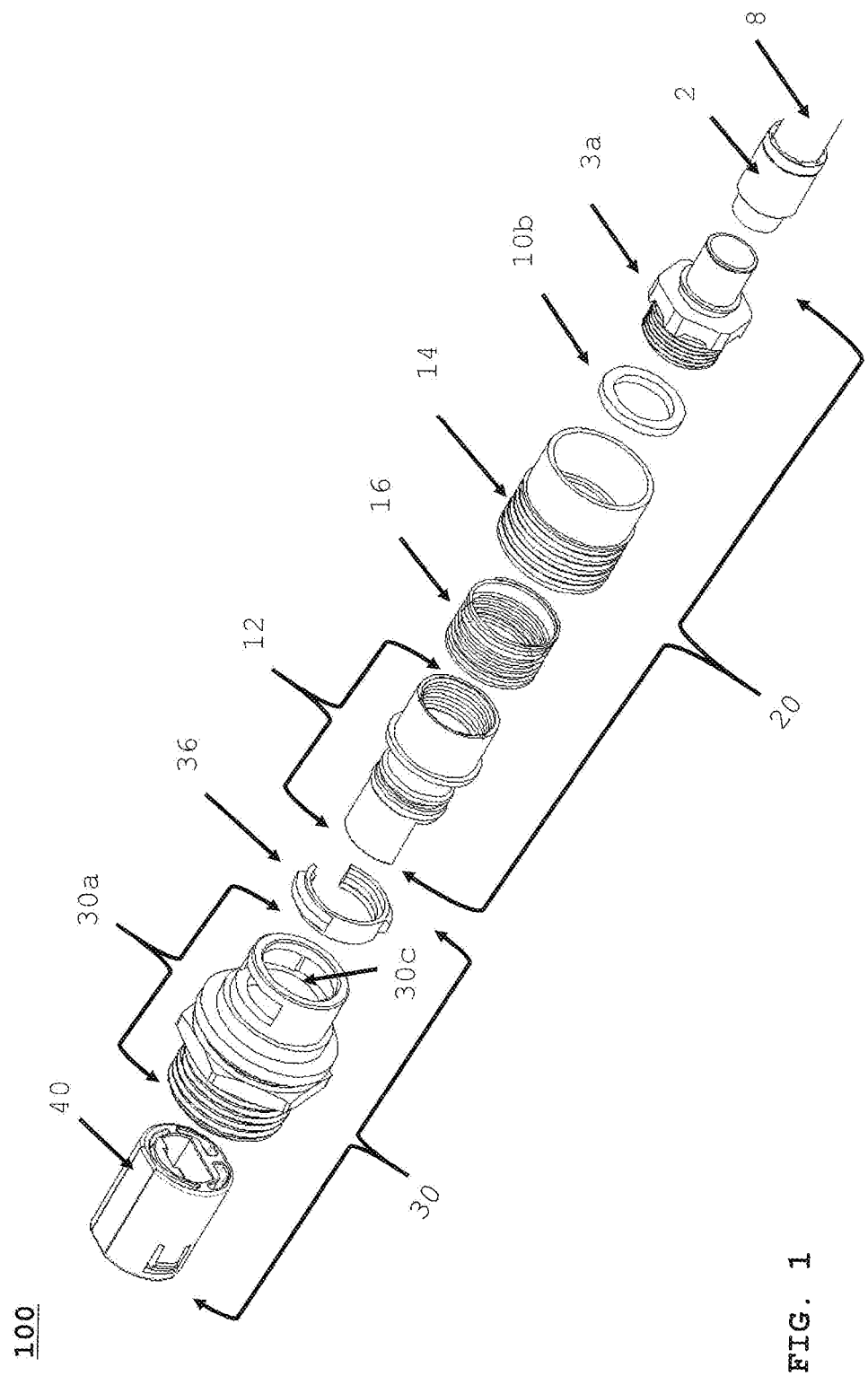
FIG. 1 is an exploded view of a connector assembly according to the present invention.

An outdoor rated connector deploying a lockable collar nut prevents disconnecting a connector and mating connector is disclosed in U.S. Pat. No. 9,477,049 B2, Gniadek et al., Lockable Connectors and Connection Assemblies, granted Oct. 25, 2016, and assigned to the owner of the present invention, and included by reference in its entirety. Gniadek does not disclose a displaceable collar nut in a longitudinal direction to unlock the connector and the mating connector, which is an improvement of the present invention.

The present invention discloses an outdoor rated connector assembly, with environmental seals, formed by a first connector and a mating connector releasably secured or locked by a ring or lock ring. A user can unlock or unmate the first connector and mating connector by pulling an outer collar nut in a rearward direction, to gain access to the internal components to service the connector assembly.

The connector assembly has opposing fiber optic connectors that are not rated for operating outside without additional protection, and a key indicator is provided to align a wing with a slot in the mating connector to ensure the opposing connectors are in the correct polarity to ensure optical and/or electrical transmission.

The present invention solves the problem of limited physical access to the separate the connector assembly into a first connector and a mating connector to access internal components for servicing. Due to the limited space between connector assemblies, a user may not be able to rotate the collar nut to unlock the connector assembly, as disclosed in Gniadek. This and other improvements over the prior art are disclosed and claimed in the present invention.

The foregoing, as well as additional objects, features and advantages of the present disclosure is apparent from the following detailed description, which proceeds with reference to the accompanying drawings Detailed Description:

This disclosure is not limited to the particular systems, devices and methods described, as these may vary. The terminology used in the description describes particular versions or embodiments only, and does not limit the scope of the present invention.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is an admission that the embodiments described in this disclosure are not entitled to antedate such disclosure by virtue of prior invention. As used in this document, the term "comprising" means "including, but not limited to."

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. The term optical fiber cable may further include multi-fiber optic cables having a plurality of the optical fibers.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable maybe connected to a connector on one end or on both ends of the cable.

For connection of cables together or with other fiber optic devices, the terminal ends of a cable may include a connector. A "connector," as used herein, refers to a device and/or components thereof that connects a first optical fiber cable to a second optical fiber cable. The connector maybe configured for fiber optic transmission or electrical signal transmission, or both. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, a straight tip (ST) connector, or a behind-the-wall (BTW) connector. The connector assembly maybe defined by a connector housing body with a fiber optic connector therein. In some embodiments, the housing body may incorporate any or all of the connector assembly components described the present application.

FIG. 1 depicts an exploded view of connector assembly (100). The connector assembly is formed by securing together of mating connector (30) and connector (20). The connector assembly is secured together with latch (36). Latch or C-shaped ring (36) is received with retention groove (12g) or locking recess. Groove (12g) extends along longitudinal width (XD) or connection axis in which latch (36) moves under the influence of collar nut (14) (refer to FIG. 10 and FIG. 11). Displacing collar nut (14) in a direction away from the mating connector, the connector is separated from the mated connector (refer to FIG. 3). Positioner (40) is received and latched within outer housing (30a) by opposing latches (401.1, 401.2) within cavity (30c) (refer to FIG. 6). Outer housing (30a) is also called latch retainer. Latch (36) sometimes also called ring or C-shaped ring, or latch ring, is received within opening (30b) at an end opposite the positioner. This forms mating connector (30) of connector assembly (100). To form first connector (20), spring (16) is placed over a first end of inner body (12), and second end comprises wing (20a) (refer to FIG. 9c) and retention groove (12g) (refer to FIG. 2), the retention groove receives latch (36) to releasable lock mating connector (30) and first connector (20) to form connector assembly (100). Outer collar nut (14) comprises inner rim (14r) (refer to FIG. 8) on which spring (16) biases closed or retains the connector assembly in a locked or mated configuration (refer to FIG. 11), until the outer collar nut (14) is pulled in an Unlock direction, compressing the spring (16) and allow the separation of the mating connector (30) and the first connector (20), to access the internal components, such as first fiber optic connector (41) and second fiber optic connector (42) (refer to FIG. 5). To complete first connector (20) backbody (3a) is screwed into a second end of outer collar nut (14), and seal (10b) is compressed therebetween to help form an ingress protected connector assembly (100). Optical cable (8) is secured to backbody (3a) using crimp ring (2).

Figure 2:
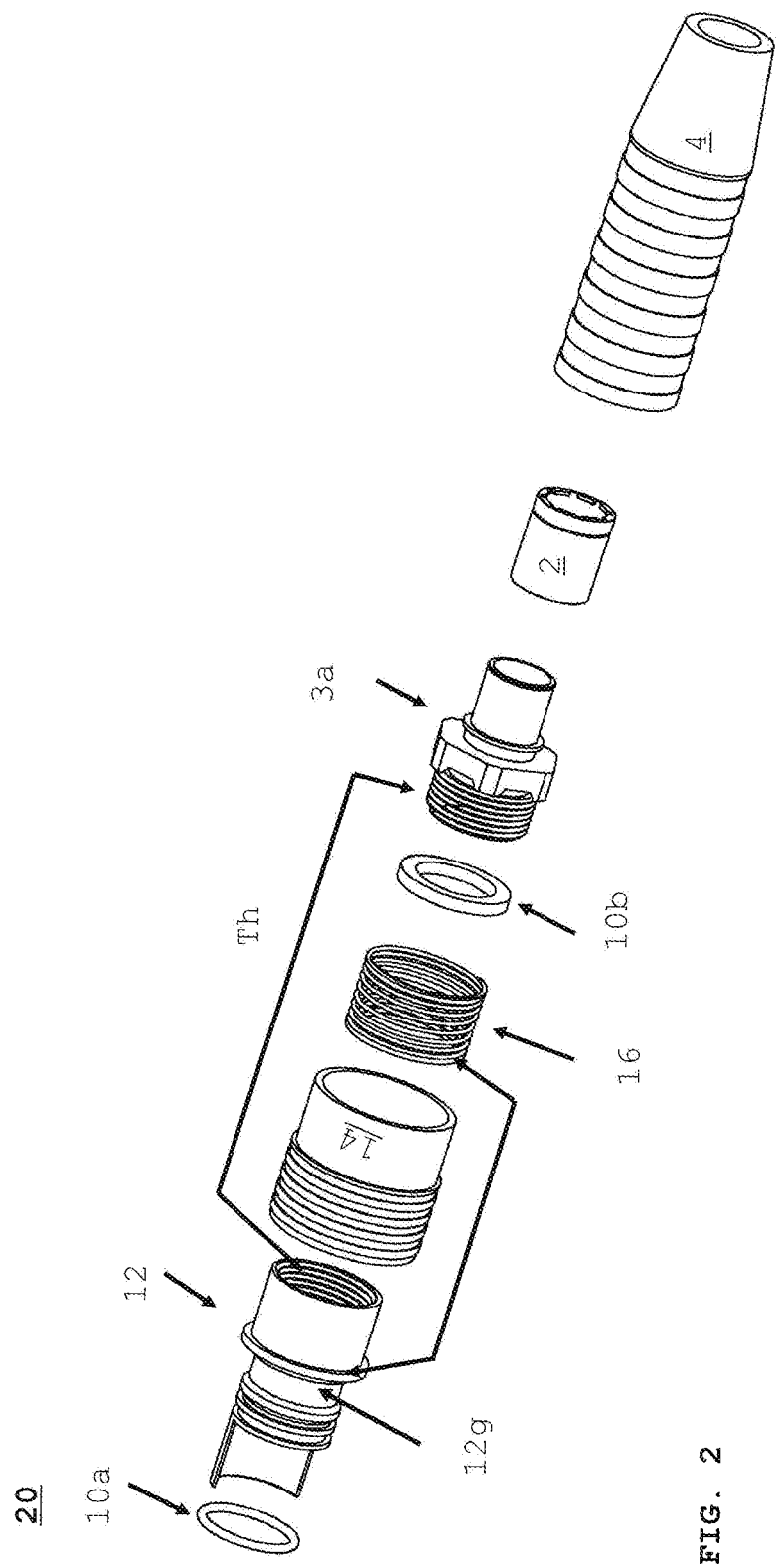
FIG. 2 is an exploded view of a first connector according to the present invention.

FIG. 2 is an exploded view of first connector (20). A second sealing ring (10a) is fitted in a retention groove formed as part of inner body (12). Retention groove (12g) accepts latch (36), and is sized to allow movement of latch (36) when outer collar nut (14) is pulled back in an Unlock position. When the outer collar nut (14) is released, spring (16) biases collar nut (14) into a Locked position. Strain relief boot (4) maybe used about incoming optical cable (8) to help reduce stress on the optical fibers connected to fiber optic connector (42, 41). To retain the above components together in an assembly, backbody (3a) is threaded (Th) into a second end of inner body (12). Inner body (12) includes locking recess (12g) or groove (12g).

Figure 3:
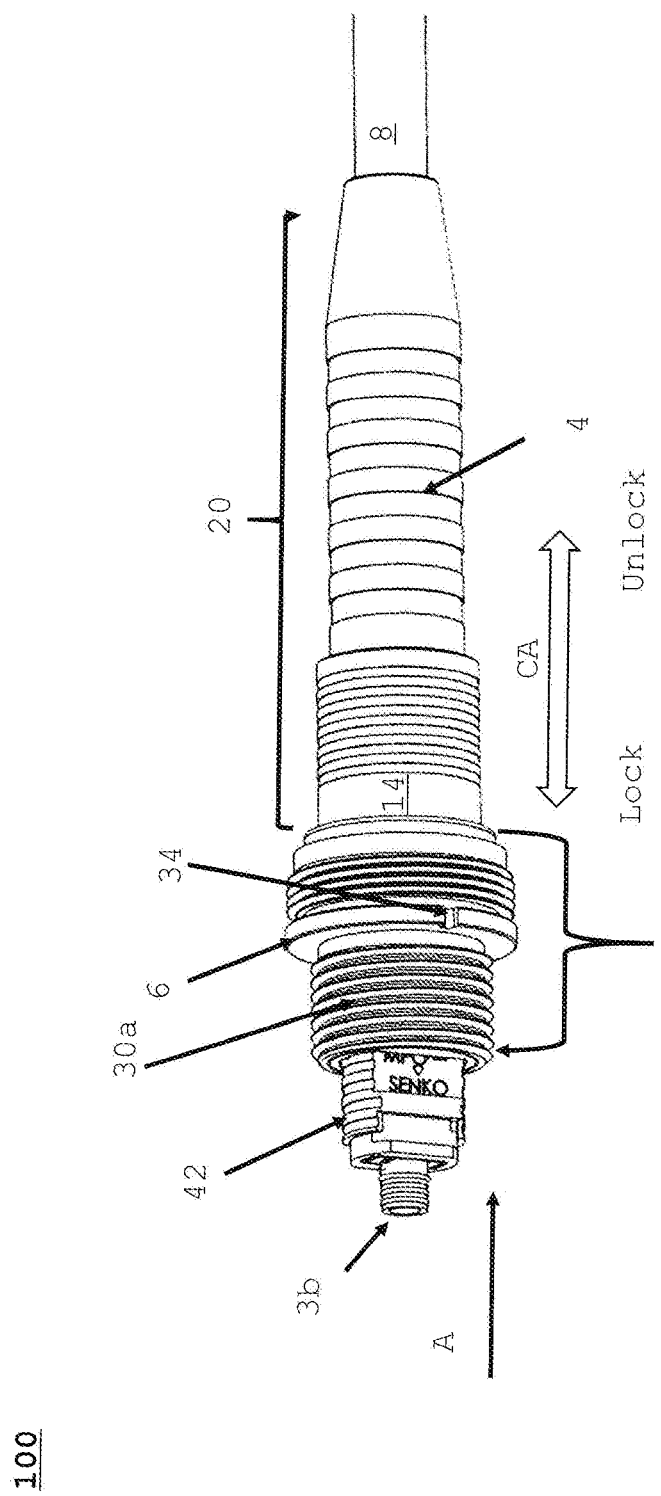
FIG. 3 is an assembled view of FIG. 2 with a fiber optic connector secured within a mating connector according to present invention.
Figure 4:
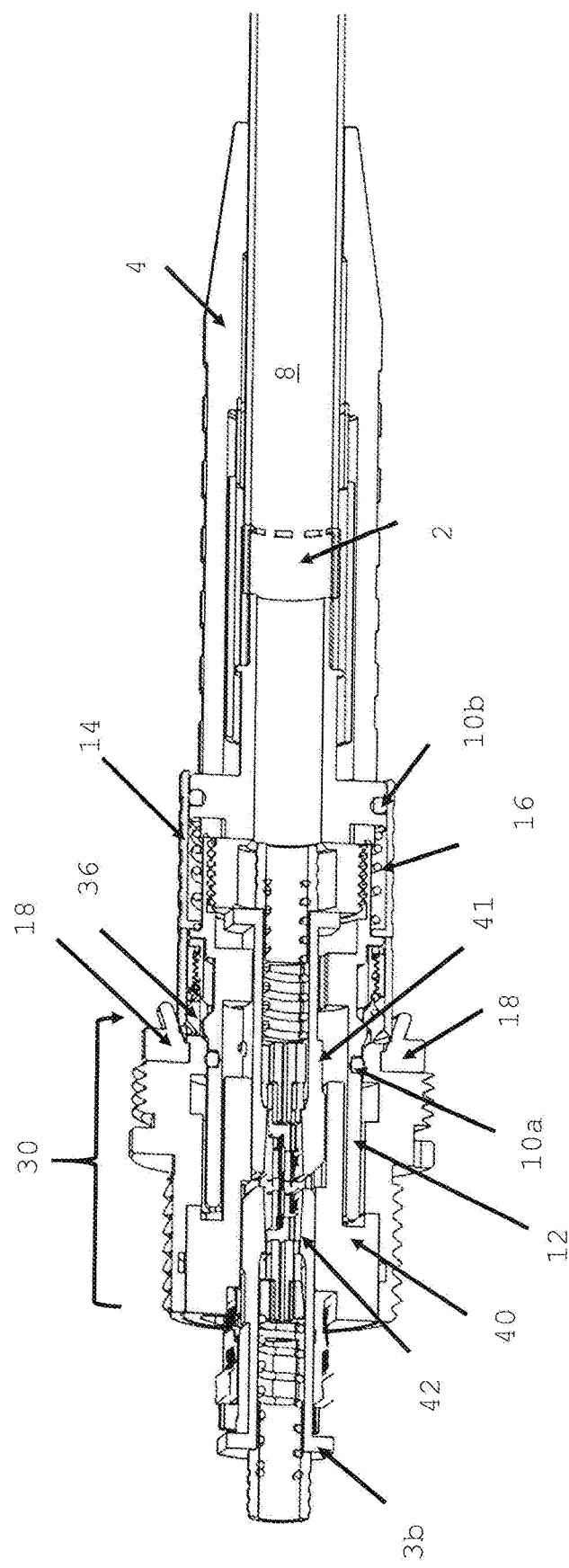
FIG. 4 is a cross-section view of FIG. 3.
Figure 5:
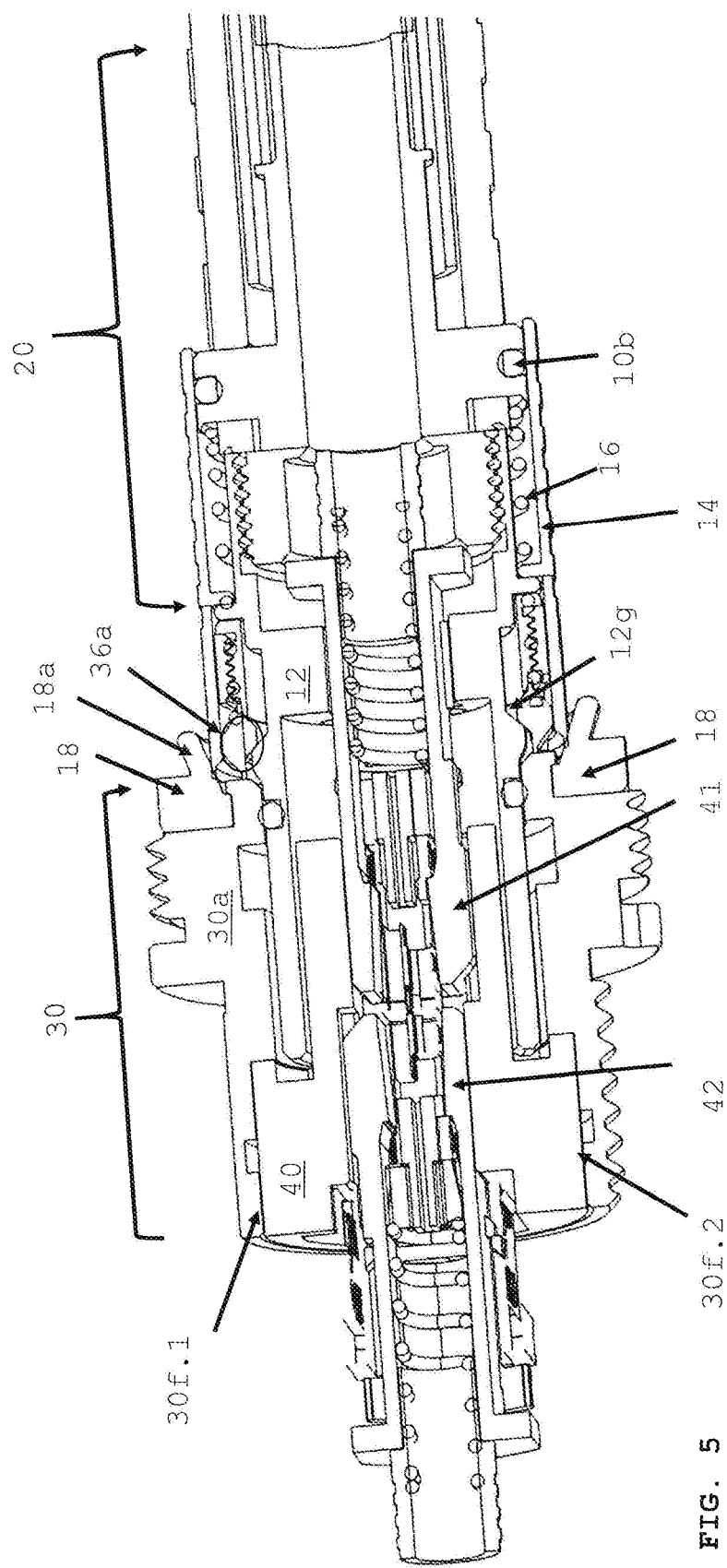
FIG. 5 is a second cross-section view of FIG. 3

FIG. 3 depicts assembled connector assembly (100) with strain relief boot (4) about optical cable (8) at a second end. First end depicts a second MPO fiber optic connector (42) with backbody (3b) to accept a second optical fiber cable, the connector is secured (in the direction of arrow A) within mating connector outer housing (30a) (refer to FIG. 4). Housing (30a) has an external thread that is secured to an adapter formed as part of panel to hold the connector assembly. Indicator (34) informs the installer to orient wing (20a) into correct slot (40s) of positioner (40) which will ensure the opposing MPO connectors (41, 42) will be able to form a transmission line by being placed in the correct polarity, that is, Tx-1, Tx-2 and RTx-1, Rx-2 of MPO connector 1, MPO connector 2. In operation as further described in FIG. 10 and FIG. 11 below, displacing outer collar nut (14) in Unlock direction would separate or unmate first connector (20) with mating connector (30), thereby allowing one to service the internal components as depicted in FIG. 4 and FIG. 5. To Lock, the installer would ensure wing (20a) is aligned with slot (40s) of positioner (40) as indicated by indicator (34), and push in first direction or Lock direction until wing (20a) is fully seated in slot (40s), as depicted in FIG. 11.

Without departing from the scope of the invention, and included by reference in its entirety, U.S. Pat. No. 9,755,382 B2, Gniadek, titled "Connector System with Interchangeable Connector Module for Optical Fibers, Electrical Conductors, or Both", granted Sep. 5, 2017, discloses an electrical transmission line can be combined with a fiber optic transmission line.

FIG. 4 depicts a first exploded view of connector assembly (100). Noting like references are described above, opposing MPO connectors (41, 42) form an optical transmission pathway. Connector assembly (100) is in a Locked position with first connector (20) mated with mating connector (30). There are environmental seals (10a, 10b) to protect against ingress of moisture or debris, which would interfere with connectors (41, 42) optical transmission. Crimp ring (2) secures optical cable (8) to backbody (3a, 3b) thereby stabilizing the optical fibers fused to optical fiber of connector (41, 42). Outer collar nut (14) is biased forward under the spring force, K, of spring (16). Operation of outer collar nut (14) and spring (16) for releasing first connector (20) and mating connector (30) is described at FIG. 8. Sealing gasket (18) is circumferential position about outer housing (30a). Gasket (18) has an inclined edge (18a) that deflects debris and moisture run-off from an outer surface of the panel that the mating connector (30) is secured to by external thread of outer housing (30a).

FIG. 5 depicts a second exploded view of connector assembly (100) zooming in on opposing connectors (41, 42) area. Noting like references are described above, inner raised surface (36a) of C-shaped ring (36) is secured with groove (12g) of inner body (12) thereby locking or securing together first connector (20) and mating connector (30), and is described in more detail at FIG. 11. Inner raised surface is also called a locking protrusion. Locking occurs when the inner raised surface (36a) is received within groove (12g) and outer raised surface (36b.3) is deflected into opening (30b) (refer to FIG. 12), the latter occurs when wing (20a) surface (20a.2) deflects surface (36b.3) upward (U) as described in in FIG. 10. Wing (20a) is configured to deflect the latch in a radial direction locking the connector and the mating connector to form a connector assembly. Positioner (40) comprises opposing flats (40d.1, 40d.2) received within outer housing (30a) and engage corresponding flats (30f.1, 30f.2) facing inward within outer housing (30a) to prevent rotation of positioner (40).

Figure 6:
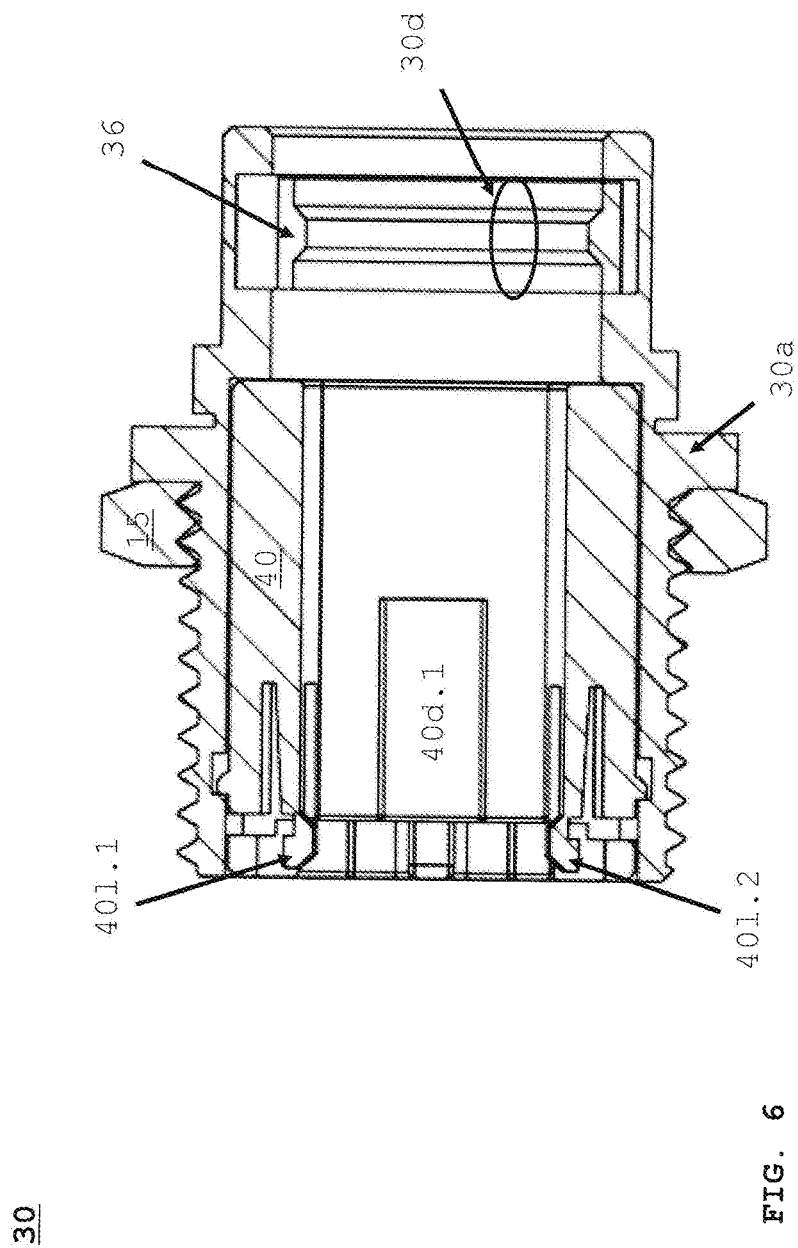
FIG. 6 is a cross-section, top view of positioner latch within mating connector.

FIG. 6 depicts a top, cross-section view of positioner (40) secured within outer housing (30a) at least one latch (401.1, 401.2) at a first end, and flat (40d.1) engaging inner flat (30f.1) of outer housing. C-shaped ring (36) or latch (36) would be positioned within opening (30d) at a second end of outer housing (30a). Panel nut (15) secures connector assembly (100) to a panel (not shown).

Figure 7:
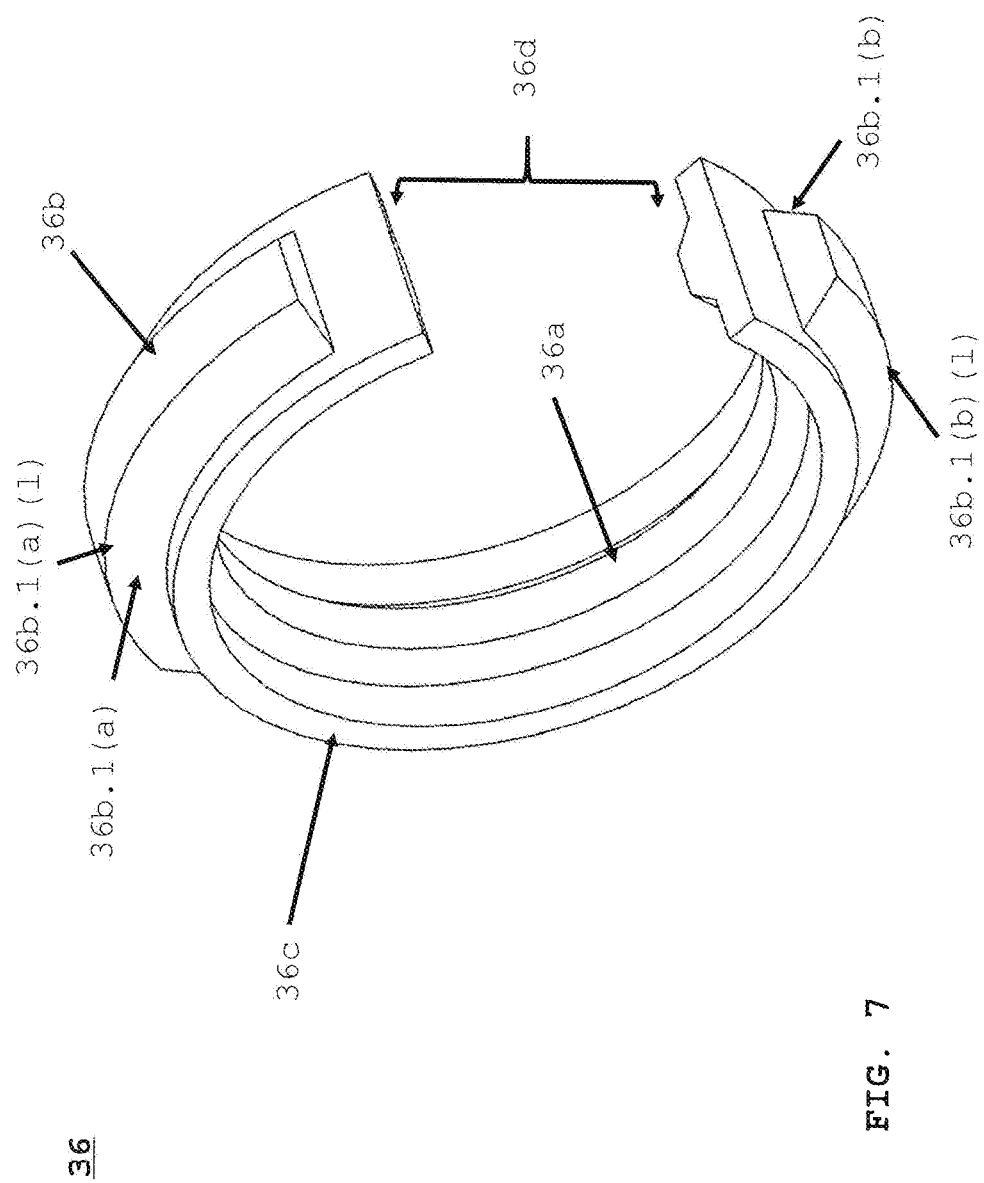
FIG. 7 is a perspective view of a latch ring for securing the connector with the mating connector.

FIG. 7 depicts latch (36) or C-shaped ring (36) formed of a main body (36c) with gap (36d). Gap (36d) allows for the ring body (36c) to deflect when the connector assembly is Locked or Unlocked by pulling on outer collar nut (14) in a rearward or second direction, or Lock when inserting wing (20a) into position slot (40s), the selected slot depends on the polarity of the MPO connectors (41, 42). Main body (36c) has outer raised surface (36b) that extends substantially about the main body, and inner raised surface (36a) that extends substantially about the main body. Inner raised surface (36a) is received in retention groove (12g) (refer to FIG. 8), its operation described in more detail. Outer raised surface (36b) is deflected further into and received within opening (30d), when connector assembly (100) is formed. Outer raised surface (36b) or locking protrusions has opposing first sloped surface (36b.1(a)) and second sloped surface (36b.1(b)). The locking protrusion extends from the latch retainer in a radial direction and positioned with respect to the latch retainer and the connector body for engagement with the mating connector upon movement of the connector and mating connector toward each other along the connection axis. Each sloped surface has a leading edge (36b.1(a)(1), 36b.1(b)(1)) to convert the relative movement of the mating connector and connector toward the connector into radial movement of the latch member with respect to the connection axis. The sloped surfaces are positioned for engagement with the mating connector to convert movement of the mating connector relative to the connector along the connection axis toward the connector into radial movement of the latch with respect to the connection axis. The sloped surface of the locking protrusion constitutes a first sloped surface, the locking protrusion further comprising a second sloped surface positioned for engagement with the mating connector to convert movement of the mating connector relative to the connector along the connection axis away from the connector into radial movement of the latch with respect to the connection axis.

Figure 8:
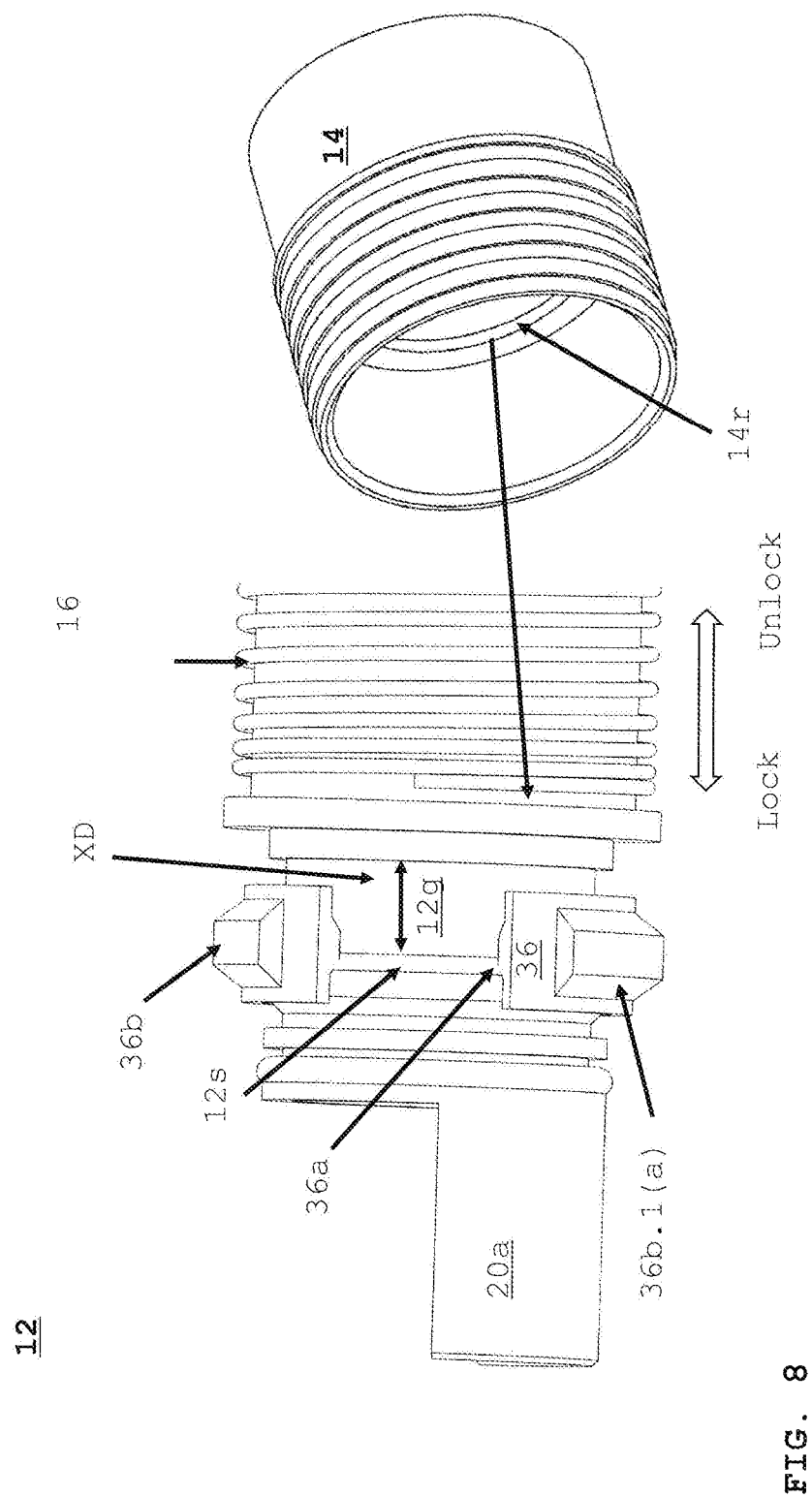
FIG. 8 is a perspective view of the first connector with a latch ring.

FIG. 8 depicts inner body (12) of first connector (20). Inner body (12) comprises wing (20a) at a first end, and the wing (20a) is used to lock the first connector (20) and the mating connector (30) together when the outer raised surface (36b) of the C-shaped ring (36) is deflected further into opening (30d). Inner raised surface (36a) of latch (36) or C-shaped ring (36) is received within retention groove (12g) and C-shaped ring (36) can move along connection axis a distance XD that corresponds to the pull distance on outer collar nut (14) to separate mated first connector (20) and mating connector (30) of connector assembly (100). Collar nut (14) comprises an inner rim (14r) that retains spring (16) so when collar nut (14) is pulled in a rearward or a second direction, the spring is compressed a distance XD, the connector assembly is separated, and upon releasing the collar nut (14) the spring biases the collar nut (14) to its original position. Pulling the collar nut (14) rearward or in Unlock direction as shown by the arrow, the connector assembly is separated into first connector (20) and mating connector (30). The first connector includes outer collar nut (14) which is moveable with respect to the remainder of first connector (20) along connection axis (CA) (refer to FIG. 3), the outer collar nut being is biased in a first direction when the first connector is secured to the second mating connector to form the connector assembly, and outer collar (14) is configured to be displaced in a second direction against the bias to unlock first connector from the second mating connector to permit the first connector (20) to be separated from the second mating connector (30).

Referring to FIG. 8, locking recess (12g) extends circumferentially about the connection axis and is facing radially outward of the inner body (12) with respect to the connection axis, the locking recess being configured to receive a portion of mating connector (30) from a radial direction, the locking recess including sloped surface (12s) positioned for engagement with the portion of the mating connector received in the locking recess to drive the portion of the mating connector radially outward from the locking recess upon movement of the connector relative to the mating connector along the connection axis away from the mating connector. (refer to FIG. 10 (U)). Inner body (12) is configured to hold an optical and/or electric transmission line therein and having a connection axis along which connection to the mating connector is made.

Figure 9:
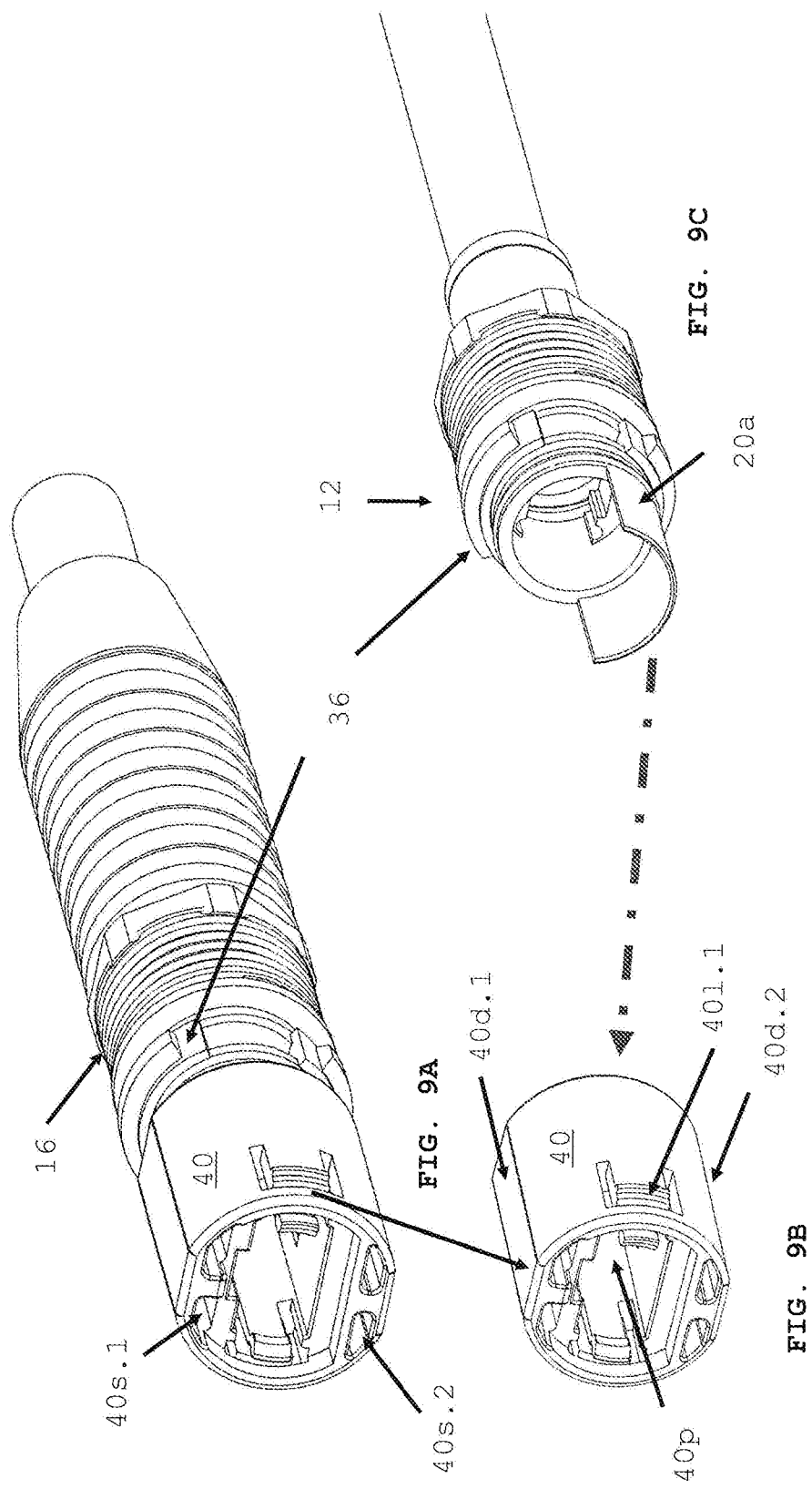
FIG. 9A is a perspective view of the positioner secured with the connector assembly in a first polarity position.
FIG. 9B is a perspective view of the positioner.
FIG. 9C is a perspective view of first connector with a wing.

FIG. 9A depicts positioner (40) secured with inner body (12) with spring (as described above), and C-shaped ring (36) secured about a first end of inner body (12). Referring to FIG. 9C, wing (20a) is inserted into slot (40s.1, 40s.2) depending on the polarity of the opposing MPO connector (41) or MPO connector (42), as indicated by indicator (34) (refer to FIG. 3). As described above, position (40) is secured within outer housing (30a) by opposing latches (401.1, 401.2) and positioner (40) is prevented from rotating within outer housing (30a) when opposing flats (40d.1, 40d.2) as shown in FIG. 9B are aligned with inner opposing flats (30f.1, 30f.2) of outer housing (30a). MPO connector (41, 42) is secured within port (40p). Positioner (40) is received within the housing (30a), the positioner has opposing slots (40s.1, 40s.2) within the positioner extending along a longitudinal axis, opposing flats (40d.1, 40d.2) on an exterior surface of the positioner, the opposing flats being engaged with the flats of the housing (30f.1, 30f.2) (refer to FIG. 5), to prevent rotation of the positioner and within outer housing (30a), and opposing latches engaging the housing to secure the positioner within the outer housing (30a) or latch retainer (30a).

Figure 10:
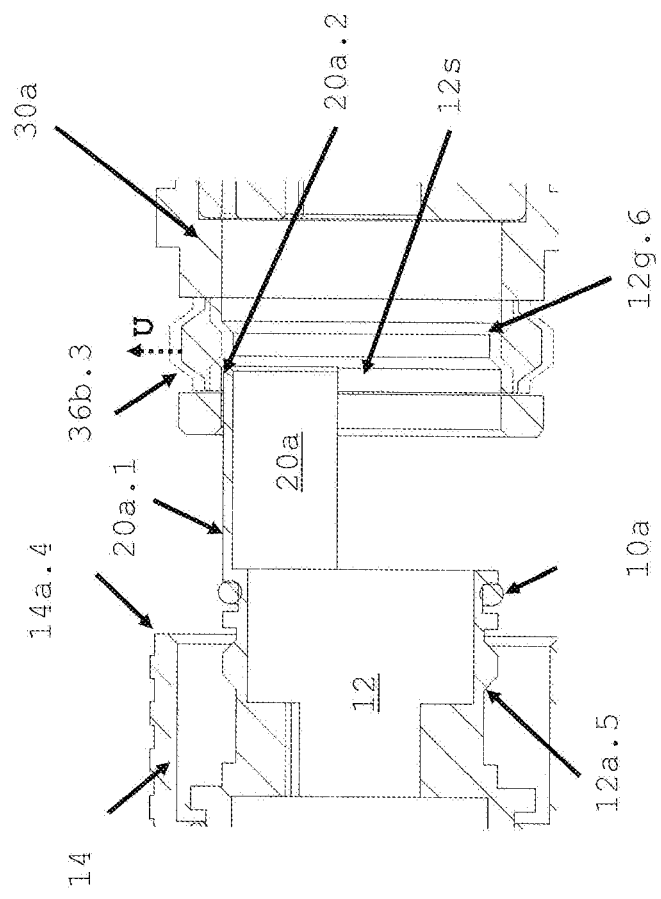
FIG. 10 is a cross-section of inserting the first connector into the mating connector.
Figure 11:
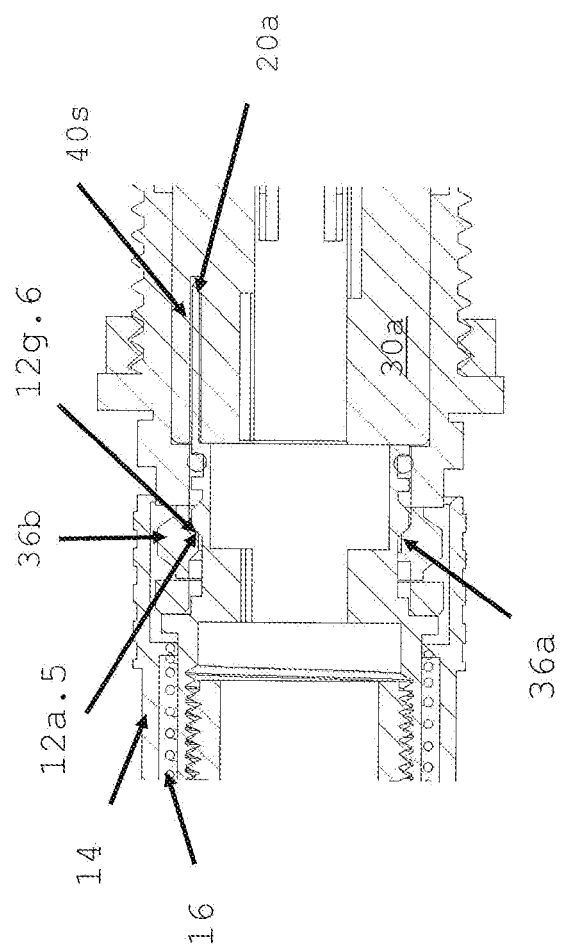
FIG. 11 is a cross-section of the first connector and mating connector secured together to form the connector assembly according to the present invention.

FIG. 10 depicts inserting wing (20a) within outer housing (30a) at a second end to Lock first connector (20) with mating connector (30) to form connector assembly (100). As leading surface (20a.2) of wing (20a) contacts inner raised surface (36a) of C-shaped ring (36), outer raised surface (36b.3) is further deflected into opening (30d) in direction of arrow U. Referring to FIG. 11, once mated surface (36b.3) is mated with face (14a.4) which indicates to the user the connector assembly is formed. Wing (20a) accepted into first or second slot (40s.1, 40s.2) also prevents rotation of first connector (20) and mating connector (30) in addition to aligning to achieve the correct polarity. Lower raised surface face (12a.5) is locked with face of inner groove (12g.6) until the user pulls outer collar nut (14) in a rearward direction to Unlock. Wing (20a) is secured with slot (40s).

As depicted in FIG. 10 and in FIG. 11, outer collar nut (14) is mounted on inner body (12) for movement with respect to inner body (12) along the connection axis between an unlocked position (Unlocked) in which outer collar nut (14) is out of radial alignment with locking recess (12g) to permit radial movement of the portion of the mating connector or latch ring (36) into and out of locking recess (12g), and a locked position (Locked) in which the outer collar nut (14) is in radial alignment with locking recess (12g) to prevent radial movement of the portion of the mating connector out of the locking recess thereby securing a locking connection between the connector and the mating connector to form the connector assembly (100).

Figure 12:
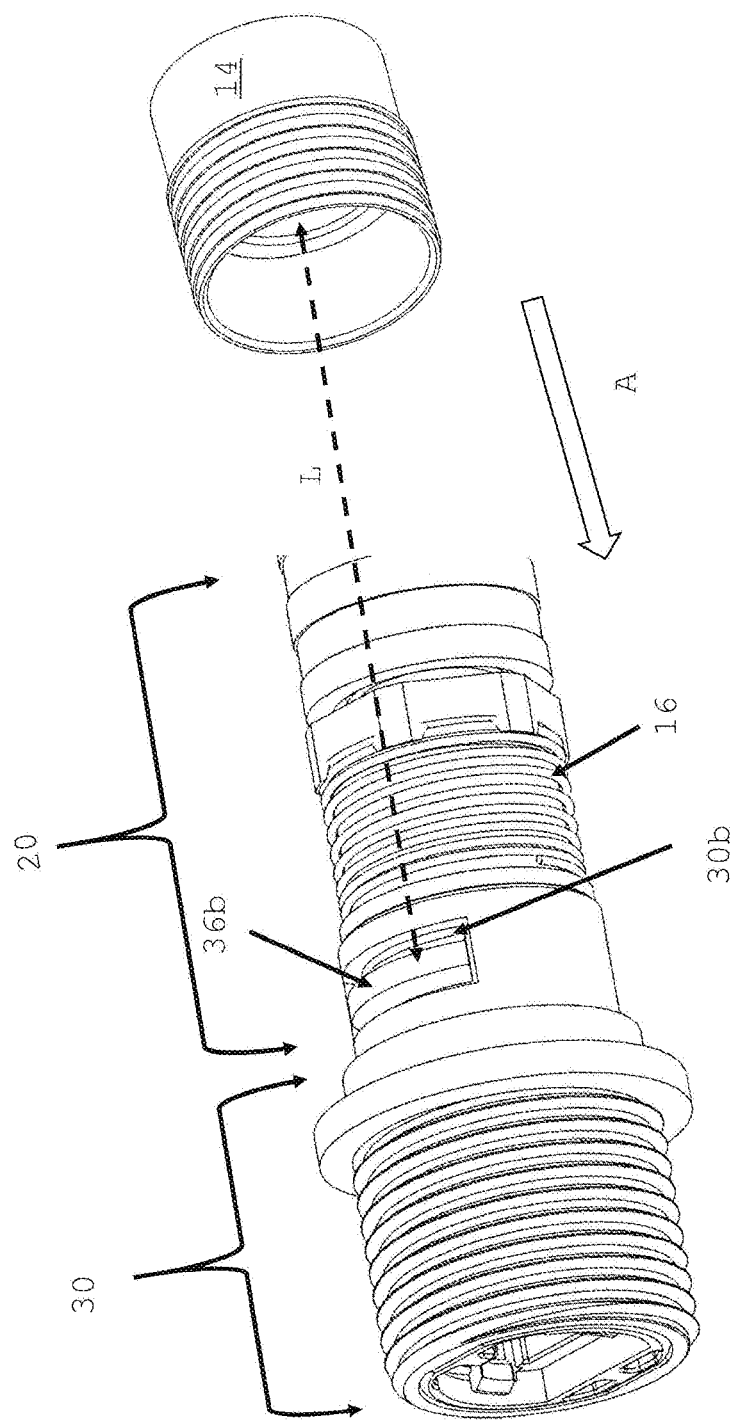
FIG. 12 is an exploded view of collar nut prior to inserting over latch ring.
Figure 13:
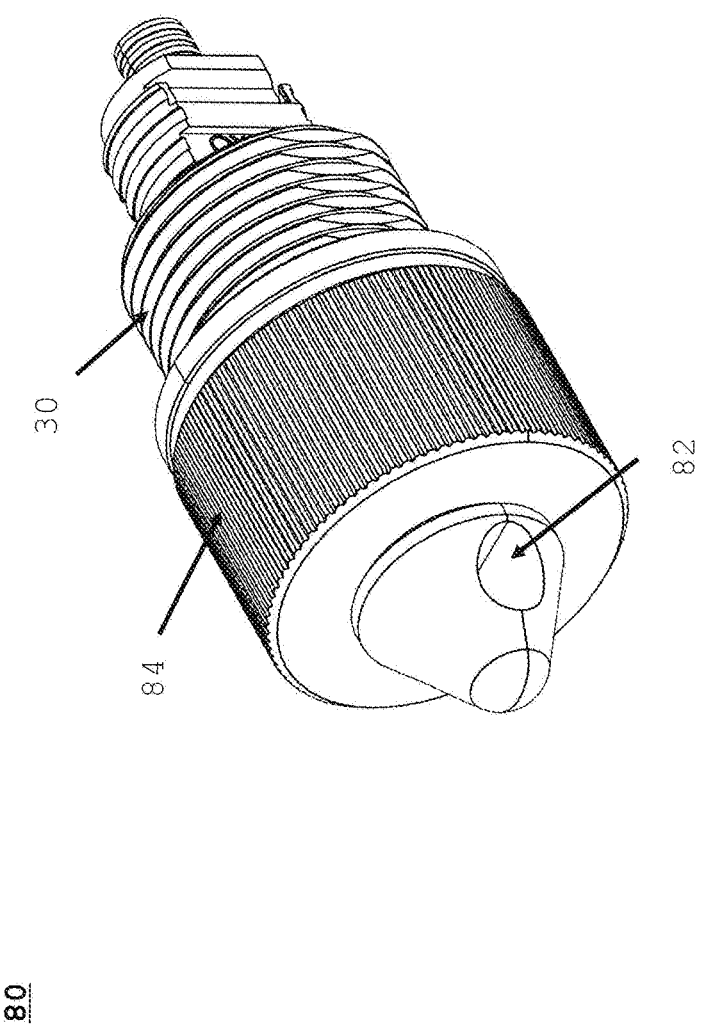
FIG. 13 is a perspective view of a dust cap.

FIG. 12 depicts first connector (20) mated with mating connector (30), and first connector (20) accepting outer collar nut (14) in the direction of arrow A, and as described in FIG. 8 above. What is dotted line L? FIG. 13 depicts a dust cap (80) with body (82) having internal threads to receive the threaded body portion of mating connector (30). Body (82) has an opening (84) to attach a tether (not shown) which can secure the dust cap to the mating connector. Dust cap helps prevent ingress of environmental material when the connector assembly is not in use.

In the above detailed description, reference is made to the accompanying drawings, which form a part hereof. In the drawings, similar symbols typically identify similar components, unless context dictates otherwise. The illustrative embodiments described in the detailed description, drawings, and claims are not limiting. Other embodiments may be used, and other changes maybe made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are illustrations of various aspects. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

Variations of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A connector assembly, comprising:
a first connector comprising an inner body configured to accept at least one first fiber optic connector, the inner body comprising an exterior locking recess;
a second mating connector configured to accept at least one second fiber optic connector, the second mating connector comprising a receptacle, the inner body of the first connector configured to be plugged into the receptacle of the second mating connector;
a ring for releasably securing the first connector to the second mating connector, the ring having an outer portion and an inner portion, the inner portion configured to selectively engage the locking recess to secure the inner body of the first connector in the receptacle of the second mating connector, the ring being selectively expandable to disengage the inner portion of the ring from the locking recess and release the inner body of the first connector from the receptacle of the second mating connector;
wherein the first connector includes an outer collar nut moveable with respect to the remainder of the first connector along a connection axis, the outer collar nut being biased in a first direction when the first connector is secured to the second mating connector to form the connector assembly such that the outer collar nut covers the outer portion of the ring and thereby prevents the ring from expanding;
and wherein the outer collar is configured to be displaced in a second direction against the bias to unlock first connector from the second mating connector to permit the first connector to be separated from the second mating connector.

2. The connector assembly according to claim 1, wherein the ring is deformable in a radial direction.

3. The connector assembly according claim 2, wherein the ring includes a break along its circumference.

4. The connector assembly according to claim 2, wherein the outer portion of the ring includes a raised surface.

5. The connector assembly according to claim 1, wherein the first connector further comprises a spring for biasing the outer collar nut in the first direction.

6. The connector assembly according to claim 1, wherein the first connector comprises a wing and the second mating connector comprises a positioner including a slot, the wing being received with a slot of the positioner when the first connector and second mating connector are mated.

7. The connector assembly according to claim 6, wherein the second mating connector includes an indicator to ensure the first connector and the second mating connector are mated with correct polarity to allow an optical signal to be transmitted between the first fiber optic connector and the second fiber optic connector.

8. The connector assembly according to claim 7, wherein the first fiber optic connector is a MPO connector and the second fiber optic connector is a MPO connector.

9. The connector assembly according to claim 1 further comprising an external gasket configured with a deflection rim, the external gasket being positioned for sealingly engaging the first connector and second mating connector when the first connector and second mating connector are mated to reduce environmental ingress from infiltrating a joint formed after the mating the first connector and the second mating connector.

10. The connector assembly according to claim 1 wherein the first connector is configured to accept at least a first electrical connector.

11. The connector assembly according to claim 1, wherein the outer collar is configured to displaced in the second direction to uncover the outer portion of the ring and thereby allow the ring to disengage from the locking recess without rotating.

12. The connector assembly according to claim 1, wherein the receptacle of the second mating connector comprises an annular wall defining a slot extending radially through the annular wall.

13. The connector assembly according to claim 12, wherein the ring is received in the receptacle such that the inner portion is inside the annular wall and the outer portion protrudes radially through the slot.

14. The connector assembly according to claim 13, wherein the collar nut is configured to receive the annular wall and ring inside the collar nut when biased in the first direction.

\* \* \* \* \*